United States Patent [19]

Liquie

[11] 3,958,526
[45] May 25, 1976

[54] SOFT TIRE ALARM

[76] Inventor: Bernard F. Liquie, 1498 Nancy Wood Drive, Apt. 8, Pontiac, Mich. 48054

[22] Filed: Aug. 26, 1974

[21] Appl. No.: 500,379

[52] U.S. Cl............................ 116/34 R; 73/146.8
[51] Int. Cl.² ...................................... B60C 23/04
[58] Field of Search........ 116/34 R, DIG. 7, DIG. 8; 73/146.2, 146.8, 146.3, 409; 340/58; 137/227

[56] References Cited
UNITED STATES PATENTS

| | | | |
|---|---|---|---|
| 2,689,481 | 9/1954 | Quiat | 116/34 R |
| 3,164,125 | 1/1965 | Stuart | 116/34 R |
| 3,285,222 | 11/1966 | Plessis et al. | 73/146.8 |

*Primary Examiner*—S. Clement Swisher
*Assistant Examiner*—Denis E. Corr
*Attorney, Agent, or Firm*—Whittemore, Hulbert & Belknap

[57] ABSTRACT

Apparatus for warning a driver of low tire inflation, especially on multiwheel vehicles, including a collapsible warning bladder positioned in a dust cover can having a snap-open cover on a wheel hub of the vehicle, pressure line conduit from the dust cover to a plurality of different tire valve stems, and valve means between the conduit and valve stems operable to connect the bladder with tire air pressure in response to a predetermined tire air pressure which is lower than a desired pressure, which valve means includes a check valve for preventing deflation of the bladder after inflation thereof.

1 Claim, 4 Drawing Figures

U.S. Patent  May 25, 1976  3,958,526
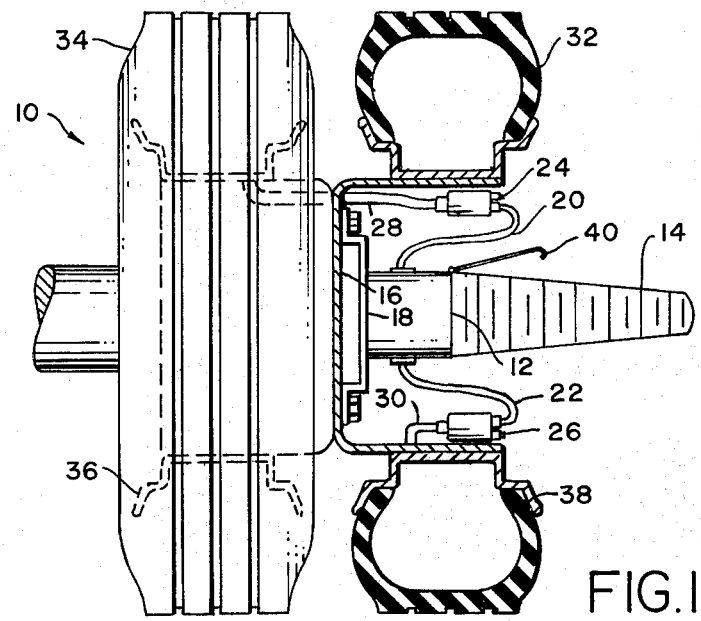
FIG.1
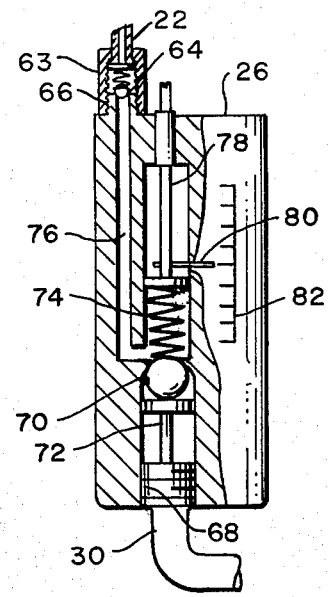
FIG.2
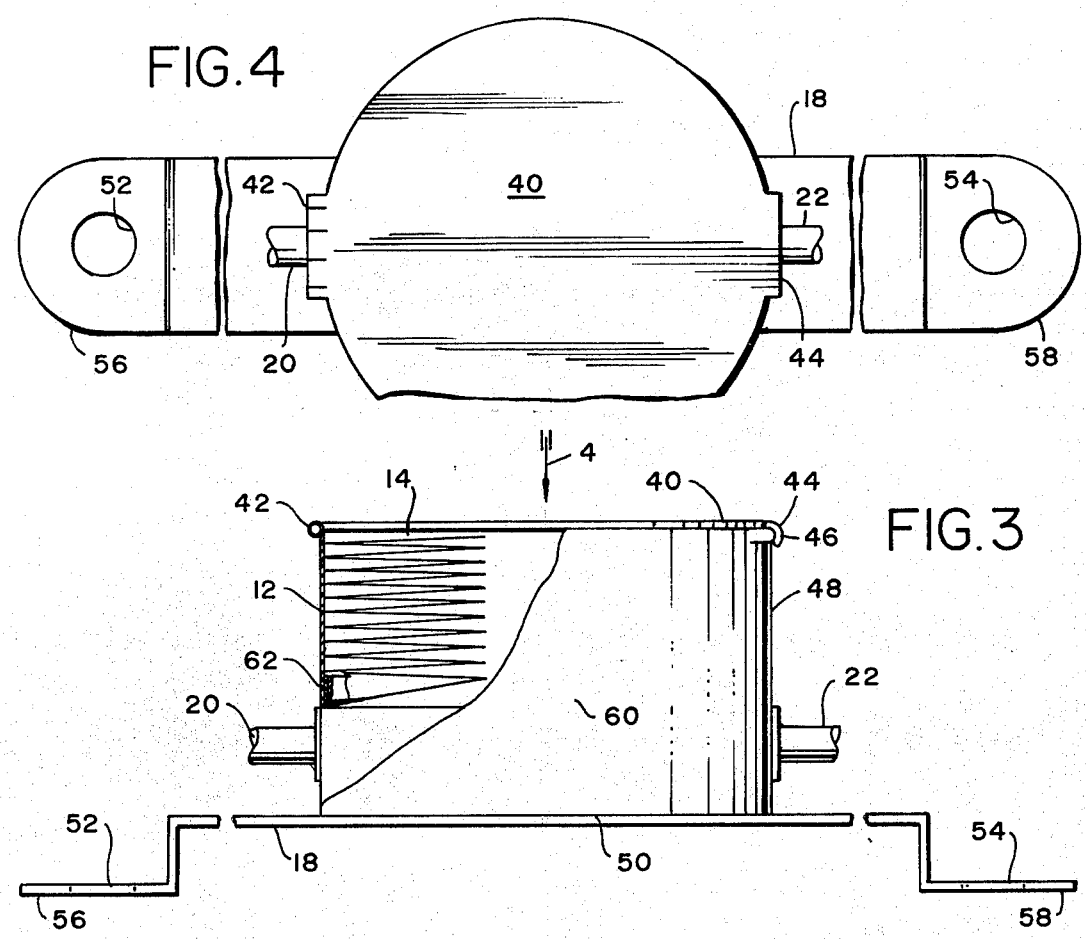
FIG.4
FIG.3

SOFT TIRE ALARM

BACKGROUND OF THE INVENTION

1. Field of the Invention

The invention relates to warning devices and refers more specifically to a device for warning a vehicle driver of low pressure in a tire. The device of the invention is particularly suited for use on large trucks having dual wheels in which the pressure in one tire on a single wheel may lose pressure while the other remains inflated so that it is difficult to recognize that the one tire is underinflated until the tire has been damaged and/or the other tire is also underflated.

2. Description of the Prior Art

In the past, tire pressure warning devices have been provided which monitor the pressure in a plurality of tires and provide an indication for the driver in response to predetermined pressures. Such prior art devices, however, such as exemplified, for example, in U.S. Pat. Nos. 3,527,189 and 3,756,190, have had mechanically actuated indicating devices and/or devices which have been complicated and therefore subject to malfunction.

Wherein devices of the past have been mechanical, they often have not provided sufficient warning to get the attention of the vehicle driver in time to prevent damage to an underinflated tire, or have been inflexible and therefore dangerous wherein they extend beyond the normal width of the vehicle to which they are secured.

The sophisticated electrical systems for warning of low tire inflation which have been provided in the past connected to buzzers and/or indicator devices in the cabs of the vehicles on which they are installed are subject to malfunction as indicated above. Further, such devices are economically unfeasible in many instances.

SUMMARY OF THE INVENTION

In accordance with the invention, a holding can having a snap-open top for receiving a warning bladder is secured to a wheel hub by the usual lug nuts. The warning bladder is positioned within the can in a folded, accordion-like position. A conduit extends between the can and valve means, which valve means is secured to the valve stem of a tire. Where dual tires are used such as on trucks, busses and the like, a plurality of conduits and valve means are provided between a single holding can and the valve stems of the individual tires.

The valve means is operable in response to a pressure below a predetermined pressure to inflate the bladder through the conduit with the pressure in the tire. The bladder, as it inflates, pops out of the holding can perpendicularly of the vehicle to which the can is secured to provide the driver with an obvious soft tire alarm. A check valve is provided in the valve means to prevent deflation of the bladder through the valve means and tire.

BRIEF DESCRIPTION OF THE DRAWINGS

FIG. 1 is an enlarged partial section view of dual wheel structure such as may be used on a truck, including soft tire alarm apparatus connected thereto which is constructed in accordance with the invention.

FIG. 2 is an enlarged, partial section view of valve means in use in the soft tire alarm apparatus of FIG. 1 between the pressure line conduit and valve stems of the individual tires.

FIG. 3 is a broken elevation view of the holding can, mounting bracket therefor and portions of the pressure line conduits of the soft tire alarm apparatus illustrated in FIG. 1.

FIG. 4 is a top view of the apparatus illustrated in FIG. 3 taken in the direction of arrow 4 in FIG. 3.

DESCRIPTION OF THE PREFERRED EMBODIMENTS

As shown best in FIG. 1, the soft tire alarm apparatus 10 of the invention includes a holding can 12 for an expandable warning bladder 14 which is secured to the wheel hub 16 by means of the mounting bracket 18. Pressure line conduits 20 and 22 extend between the respective valve means 24 and 26 and the valve stems 28 and 30. The valve stems 28 and 30 are in communication with the tires 32 and 34 mounted on the rims 36 and 38 which are secured to the hub 16.

In more detail, the holding can 12 for the warning bladder 14 is generally circular in cross section and has a cover 40. The cover 40 is hinged to the can 12 by hinge means 42 and is held closed by mating locking ridges 44 and 46 on the cover 40 and can body 48. The can 12 is further provided with a bottom 50.

The can 12 is secured to the mounting bracket 18 by convenient means such as welding, soldering or the like. The bracket 18 is shaped generally as shown in FIGS. 3 and 4 and is provided with openings 52 and 54 through the offset ends 56 and 58 thereof. The bracket 18 is in turn secured to the wheel hub 16 by passing the wheel studs through the openings 52 and 54 and securing the wheel lug nuts on the studs.

The warning bladder 14 is secured on the holding can 12 around the side of the body thereof by convenient means such as a pressure ring 60 above the connections of the conduits 20 and 22 to the holding can. As shown best in FIG. 3, the ring 60 may be positioned in the can 12 from the open end of the can with the cover 40 open and the end 62 of the bladder folded over the ring 60.

The warning bladder is an accordion style bladder which can be collapsed into the can when not inflated. The bladder may be made of luminous coated rubber so as to be visible at night as well as in the daytime, or may be any of a variety of plastic materials.

In use, on being inflated the bladder 14 pops open the top 40 of the holding can 12 and extends transversely of the vehicle, as shown in FIG. 1, a distance to insure that the warning bladder is noticed by the driver of the vehicle.

The warning bladder may in fact be used in conjunction with a sign on the rear or side of the vehicle asking passing motorists to either honk their horns or blink their lights to alert the driver of the vehicle that the warning bladder is extended.

The pressure line conduits may be any flexible hose capable of sustaining the pressures usually found in vehicle tires. The conduits are provided with a quick disconnect fittings 63 adjacent the valve structures. Further, the pressure conduits are provided with check valves 64 therein adjacent to or included within the quick disconnect fitting as shown in FIG. 2. The check valves 64 maintain the warning bladder inflated once it is inflated, even though the pressure in the tire associated with the particular conduit may be reduced below the pressure in the extended warning bladder.

The valve means 26 shown in section in FIG. 2 includes a threaded stud 66 to which the quick disconnect fitting is secured and a threaded opening 68 adapted to receive the valve stem 30. Internally the valve structure 26 is provided with a pressure differential valve 70 and valve member 72. The valve 70 and valve member 72 are biased by the spring 74 and bias adjusting screw 78 in a direction so that valve member 72 opens the valve stem 30.

On connecting the valve structure 26 to the valve stem 30 so that the valve member 72 opens the valve stem 30, the pressure in the tire 32 will close the valve 70 against the pressure of the bias spring 74. When the pressure in the tire is reduced just past the point determined by the force exerted by the spring 74, the spring 74 will urge the valve 70 off its seat to permit air from the tire 32 to pass through valve stem 30 by valve 70, through passage 76 in the valve means 26, past the check valve 64 and thus into the pressure conduit 22 to inflate the warning bladder 14.

The bias pressure of the spring 74 as shown in FIG. 2 is determined by the position of the pressure adjusting screw 78. The screw 78 may be provided with an indicator member 80 thereon in conjunction with a pressure scale 82 on the valve means 26. Thus, the tire pressure at which the valve means 26 will cause the warning bladder 14 to be inflated may be selected by rotation of the screw 78.

In overall use, the tire safety alarm apparatus 10 is secured to the rim 16 by lug nuts, as indicated above, the valve means 24 and 26, which are alike, are secured to the valve stems after the tires have been properly inflated and the pressure conduits 20 and 22 are connected to the valve means 24 and 26. Subsequently, in driving, if the pressure in either the tire 32 or 34 becomes low, a valve 70 in the valve means 24 or 26 will become unseated by a spring 74 and the warning bladder 14 will become inflated to pop the cover 40 of the holding can for the bladder. The bladder will extend perpendicularly outwardly from the side of the vehicle at the level of the vehicle axle to provide a visual indication of low tire pressure. The vehicle driver may then reduce speed and continue to a place where the tires may be checked and/or changed, if necessary. After a tire has been properly repaired and inflated again, the warning bladder 14 may be repositioned in the holding can 12 for continued use.

The soft tire alarm system 10 as disclosed above may be conveniently used for highway busses, school busses, and trucks, both civilian and military, and is an inexpensive warning system which may be conveniently installed on existing vehicles and is substantially maintenance-free. The use of such devices will prevent damaged tires and serious accidents resulting in loss of life, cargo and damage to the vehicle. Further, the system as disclosed above eliminates human error and the possibility of forgetting to check tire pressure.

While one embodiment of the present invention has been considered in detail, it will be understood that other embodiments and modifications thereof are contemplated by the inventor. Thus, with slight modification, the device could be used to provide a warning for excessively high pressure or both high and low pressure, as desired. It is the intention to include all such embodiments and modifications as are defined by the appended claims within the scope of the invention.

What I claim as my invention is:

1. Tire pressure indicating apparatus comprising a warning bladder, means for securing the warning bladder to the wheel of a vehicle for extension transversely of the vehicle on inflation of the bladder, means for connecting the bladder to at least one vehicle tire including pressure sensitive valve means for inflating the bladder from the tire in response to predetermined tire pressure wherein the means for connecting the bladder to the tire includes a pressure conduit between the bladder and valve means, a check valve operably associated with the pressure conduit operable under pressure to permit air under pressure to flow into the bladder and to prevent return air flow from the bladder into the tire, and wherein the valve means includes a valve operable to open a passage between the tire and bladder, a spring biasing the valve toward an open position in opposition to tire pressure and a screw for adjusting the spring bias on the valve.

* * * * *